United States Patent
Luk et al.

(10) Patent No.: US 7,343,602 B2
(45) Date of Patent: *Mar. 11, 2008

(54) SOFTWARE CONTROLLED PRE-EXECUTION IN A MULTITHREADED PROCESSOR

(75) Inventors: Chi-Keung Luk, Shrewsbury, MA (US); Joel S. Emer, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1179 days.

This patent is subject to a terminal disclaimer.

(21) Appl. No.: 10/029,699

(22) Filed: Dec. 18, 2001

(65) Prior Publication Data

US 2002/0055964 A1 May 9, 2002

Related U.S. Application Data

(60) Provisional application No. 60/198,530, filed on Apr. 19, 2000.

(51) Int. Cl.
*G06F 9/46* (2006.01)
*G06F 9/44* (2006.01)
*G06F 12/00* (2006.01)

(52) U.S. Cl. .................. 718/100; 712/228; 712/229; 711/117

(58) Field of Classification Search ............... 714/10, 714/11; 712/1, 23, 216–245; 710/34; 718/100–108; 709/208; 717/130; 719/317; 711/117
See application file for complete search history.

(56) References Cited

U.S. PATENT DOCUMENTS

| | | | | |
|---|---|---|---|---|
| 5,138,708 A | * | 8/1992 | Vosbury ..................... | 714/11 |
| 5,159,686 A | * | 10/1992 | Chastain et al. ............ | 718/105 |
| 5,261,097 A | * | 11/1993 | Saxon ........................ | 718/106 |
| 5,339,415 A | * | 8/1994 | Strout et al. ................ | 718/102 |
| 5,724,565 A | * | 3/1998 | Dubey et al. ............... | 712/245 |
| 5,758,142 A | | 5/1998 | McFarling et al. | |
| 5,781,776 A | * | 7/1998 | Johnston et al. ............ | 717/130 |
| 5,812,811 A | * | 9/1998 | Dubey et al. ............... | 712/216 |
| 5,815,727 A | * | 9/1998 | Motomura ................... | 712/1 |
| 5,904,732 A | | 5/1999 | Greenley et al. | |
| 5,933,860 A | | 8/1999 | Emer et al. | |
| 5,978,838 A | * | 11/1999 | Mohamed et al. .......... | 709/208 |

(Continued)

OTHER PUBLICATIONS

Rotenberg, Eric, "ArSMT: A Microarchitecutal Approcach to Fault Tolerane in Microprocessor", 29th Int'l Symp on Fault-Tolerant Computing, Jun. 1999, 8 pages.*

(Continued)

*Primary Examiner*—Meng-Al T. An
*Assistant Examiner*—Jennifer N. To

(57) ABSTRACT

A processor capable of running multiple threads runs a program in one thread (called the "main" thread) and at least a portion of the same program in another thread (called the "pre-execution" thread). The program in the main thread includes instructions that cause the processor to start and stop pre-execution threads and direct the processor as to which part of the program is to be run through the pre-execution threads. Preferably, such instructions cause the pre-execution thread to run ahead of the main thread in program order. In that way, any cache miss conditions that are encountered by the pre-execution thread are resolved before the main thread requires that same data. Therefore, the main thread should encounter few or no cache miss conditions.

36 Claims, 3 Drawing Sheets

U.S. PATENT DOCUMENTS

| | | | |
|---|---|---|---|
| 6,032,245 A * | 2/2000 | Georgiou et al. | 712/23 |
| 6,199,117 B1 * | 3/2001 | Cox et al. | 719/328 |
| 6,219,782 B1 * | 4/2001 | Khan et al. | 712/227 |
| 6,353,881 B1 * | 3/2002 | Chaudhry et al. | 712/228 |
| 6,457,063 B1 * | 9/2002 | Chintalapati et al. | 719/317 |
| 6,757,811 B1 | 6/2004 | Mukherjee | |
| 6,928,645 B2 * | 8/2005 | Wang et al. | 718/102 |

OTHER PUBLICATIONS

Akkary et al., "A Dynamic Multithreading Processor", 1998, IEEE, pp. 1-11.*

Marcuello et al., "Exploiting Speculative Thread-Level Parallelism on a SMT Processor", 1999, AC.UPC.ES, pp. 1-12.*

M. Franklin, "Incorporating Fault Tolerance in Superscalar Processors," Proceedings of High Performance Computing, Dec. 1996 (pp. 301-306).

A. Mahmood et al., "Concurrent Error Detection Using Watchdog Processors—A Survey," IEEE Trans. on Computers, vol. 37, No. 2, Feb. 1988 (pp. 160-174).

J. H. Patel et al., "Concurrent Error Detection In ALU's by Recomputing With Shifted Operands," IEEE Trans. on Computers, vol. 31, No. 7, Jul. 1982 (pp. 589-595).

D. A. Reynolds et al., "Fault Detection Capabilities Of Alternating Logic," IEEE Trans. on Computers, vol. 27, No. 12, Dec. 1978 (pp. 1093-1098).

E. Rotenberg et al., "Trace Cache: A Low Latency Approach To High Bandwidth Instruction Fetching," Proceedings of the 29th Annual International Symposium on Microarchitecture, Dec. 1996 (pp. 24-34).

E. Rotenberg et al., "Trace Processors," 30th Annual International Symposium on Microarchitecture (Micro-30), Dec. 1997(pp. 138-148).

T. J. Slegel et al., "IBM's S/390 G5 Microprocessor Design," IEEE Micro, pp. 12-23, Mar./Apr. 1999 (pp. 12-23).

J. E. Smith et al., "Implementing Precise Interrupts In Pipelined Processors," IEEE Trans. on Computers, vol. 37, No. 5, May 1988 (pp. 562-573).

G. S. Sohi et al., "A Study Of Time-Redundant Fault Tolerance Techniques For High-Performance Pipelined Computers," Digest of Papers, 19th International Symposium in Fault-Tolerant Computing, 1989 (pp. 436-443).

G. S. Sohi et al., "Instruction Issue Logic For High-Performance, Interruptible, Multiple Functional Unit, Pipelined Computers," IEEE Transactions on Computers, vol. 39, No. 3, Mar. 1990 (pp. 349-359).

D. M. Tullsen, et al., "Simultaneous Multithreading: Maximizing On-Chip Parallelism," Proceedings of the 22nd Annual International Symposium on Computer Architecture, Italy, Jun. 1995 (12 pp.).

S. K. Reinhardt et al., "Transient Fault Detection Via Simultaneous Multithreading," undated (12 pp.).

L. Spainhower et al., "IBM S/390 Parallel Enterprise Server G5 Fault Tolerance: A Historical Perspective," IBM J. Res. Develop. vol. 43, No. 5/6, Sep./Nov. 1999 (pp. 863-873).

M. Franklin, "A Study Of Time Redundant Fault Tolerance Techniques For Superscalar Processors," undated (9 pp.).

* cited by examiner

SOFTWARE CONTROLLED PRE-EXECUTION IN A MULTITHREADED PROCESSOR

CROSS-REFERENCE TO RELATED APPLICATIONS

This application relates to non-provisional U.S. application Ser. No. 09/584,034, filed on May 30, 2000, and entitled "Slack Fetch to Improve Performance in a Simultaneous and Redundantly Threaded Processor" and to provisional application Ser. No. 60/198,530, filed on Apr. 19, 2000, and entitled "Transient Fault Detection Via Simultaneous Multithreading," the teachings of both of which are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to microprocessors. More particularly, the present invention relates to a computer capable of running multiple threads that can concurrently process instructions in at least two separate threads. More particularly still, the invention relates to pre-executing at least a portion of a program as separate threads to avoid cache misses.

2. Background of the Invention

Most modern computer systems include at least one central processing unit ("CPU") and a main memory. Multiprocessor systems include more than one processor and each processor typically has its own memory which may or may not be shared by other processors. The speed at which the CPU can decode and execute instructions and operands depends upon the rate at which the instructions and operands can be transferred from main memory to the CPU. In an attempt to reduce the time required for the CPU to obtain instructions and operands from main memory, many computer systems include a cache memory coupled between the CPU and main memory.

A cache memory is a relatively small, high-speed memory (compared to main memory) buffer that is used to temporarily hold those portions of the contents of main memory which it is believed will be used in the near future by the CPU. The main purpose of a cache is to shorten the time necessary to perform memory accesses, both for data and instructions. Cache memory typically has access times that are several or many times faster than a system's main memory. The use of cache memory can significantly improve system performance by reducing data access time, therefore permitting the CPU to spend far less time waiting for instructions and operands to be fetched and/or stored.

A cache memory, typically comprising some form of random access memory ("RAM") includes many blocks (also called lines) of one or more words of data. Associated with each cache block in the cache is a tag. The tag provides information for mapping the cache line data to its main memory address. Each time the processor makes a memory reference (i.e., load or store), a tag value from the memory address is compared to the tags in the cache to see if a copy of the requested data resides in the cache. If the desired memory block resides in the cache, then the cache's copy of the data is used in the memory transaction, instead of the main memory's copy of the same data block. However, if the desired data block is not in the cache, the block must be retrieved from the main memory and supplied to the processor. A copy of the data also is stored in the cache.

Because the time required to retrieve data from main memory is substantially longer than the time required to retrieve data from cache memory, it is highly desirable have a high cache "hit" rate. Although cache subsystems advantageously increase the performance of a processor, not all memory references result in a cache hit. A cache "miss" occurs when the targeted memory data has not been cached and must be retrieved from main memory. Thus, cache misses detrimentally impact the performance of the processor, while cache hits increase the performance. Anything that can be done to avoid cache misses is highly desirable, and there still remains room for improvement in this regard.

BRIEF SUMMARY OF THE INVENTION

The problems noted above are solved in large part using a processor (e.g., a simultaneous multithreading processor) that can run a program in one thread (called the "main" thread) and at least a portion of the same program in another thread (called the "pre-execution" thread). In general, the concepts apply to any computer that can execute multiple threads of control that share common cache structures. The program in the main thread includes instructions that cause the processor to start and stop pre-execution threads and direct the processor as to which part of the program is to be run through the pre-execution threads. Preferably, such instructions cause the pre-execution thread to run ahead of the main thread in program order (i.e., fetching an instruction from the program before the main thread fetches the same instruction). In this way, preferably any cache miss conditions that are encountered by the pre-execution thread are resolved before the main thread requires that same data. Therefore, the main thread should encounter few or no cache miss conditions, and overall performance is increased.

In accordance with one embodiment, the invention is embodied as a computer system which includes a simultaneous multithreading processor, an I/O controller coupled to said processor, an I/O device coupled to said I/O controller, and a main system memory coupled to said processor, wherein said processor processes a program in a main thread that includes instructions which cause the processor to spawn a pre-execution thread in which at least a portion of the same program executes, said pre-execution thread runs concurrently with the main thread, but ahead of the main thread in program order. Further, another embodiment of the invention includes a method of running a program in a simultaneous multithreading processor comprising inserting pre-execution thread instructions in the program, spawning a pre-execution thread when designated by the inserted instructions, and running said pre-execution thread concurrently with a main thread wherein both the pre-execution and the main threads including instructions from the same program, the pre-execution thread running ahead of the main thread.

In addition to reducing the potential for cache misses to occur, the technique described herein can be used to mitigate the effects of branch mispredictions. These and other benefits will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 4:
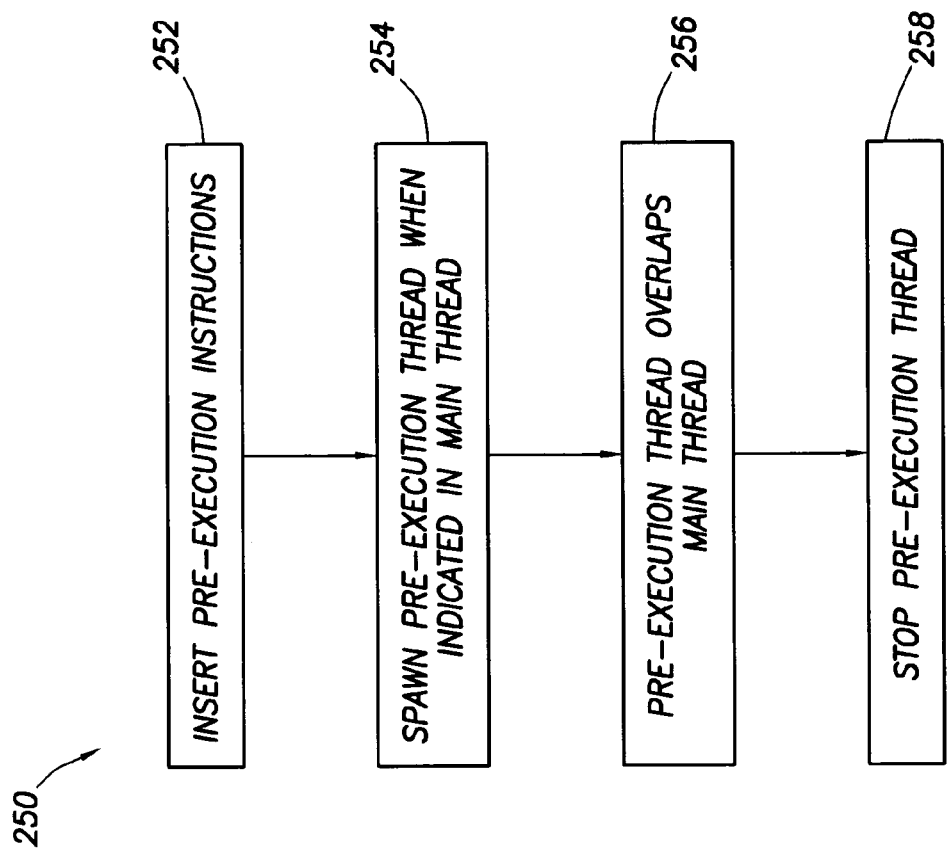
FIG. 4 illustrates a preferred embodiment of embedding software instructions in a program to spawn pre-execution threads to reduce the potential for cache misses in the main program.
Figure 1:
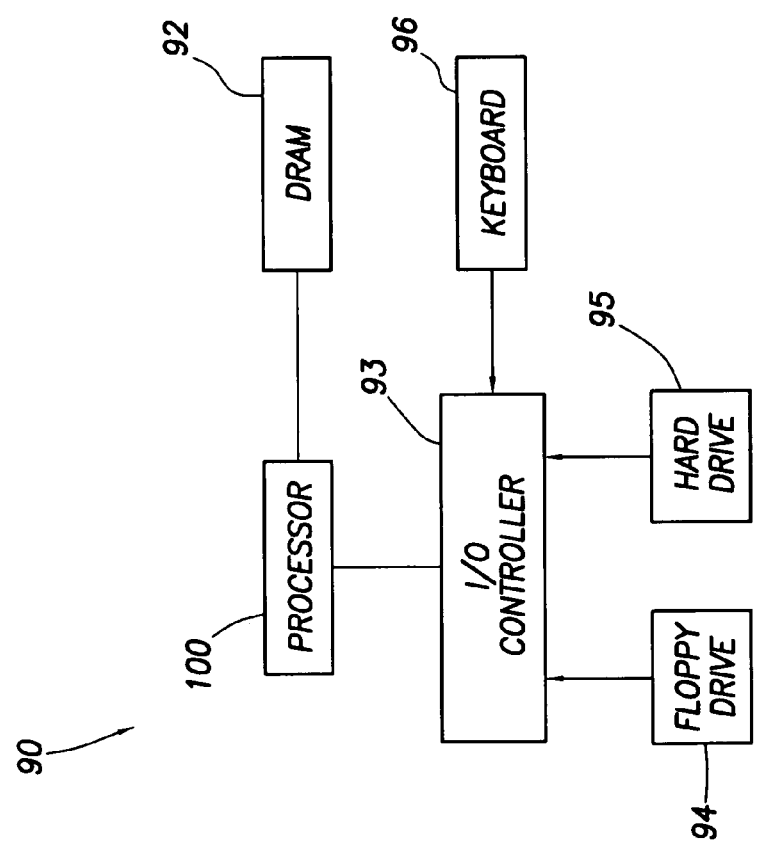
FIG. 1 is a diagram of a computer system constructed in accordance with the preferred embodiment of the invention and including a simultaneous multithreading processor.
Figure 2:
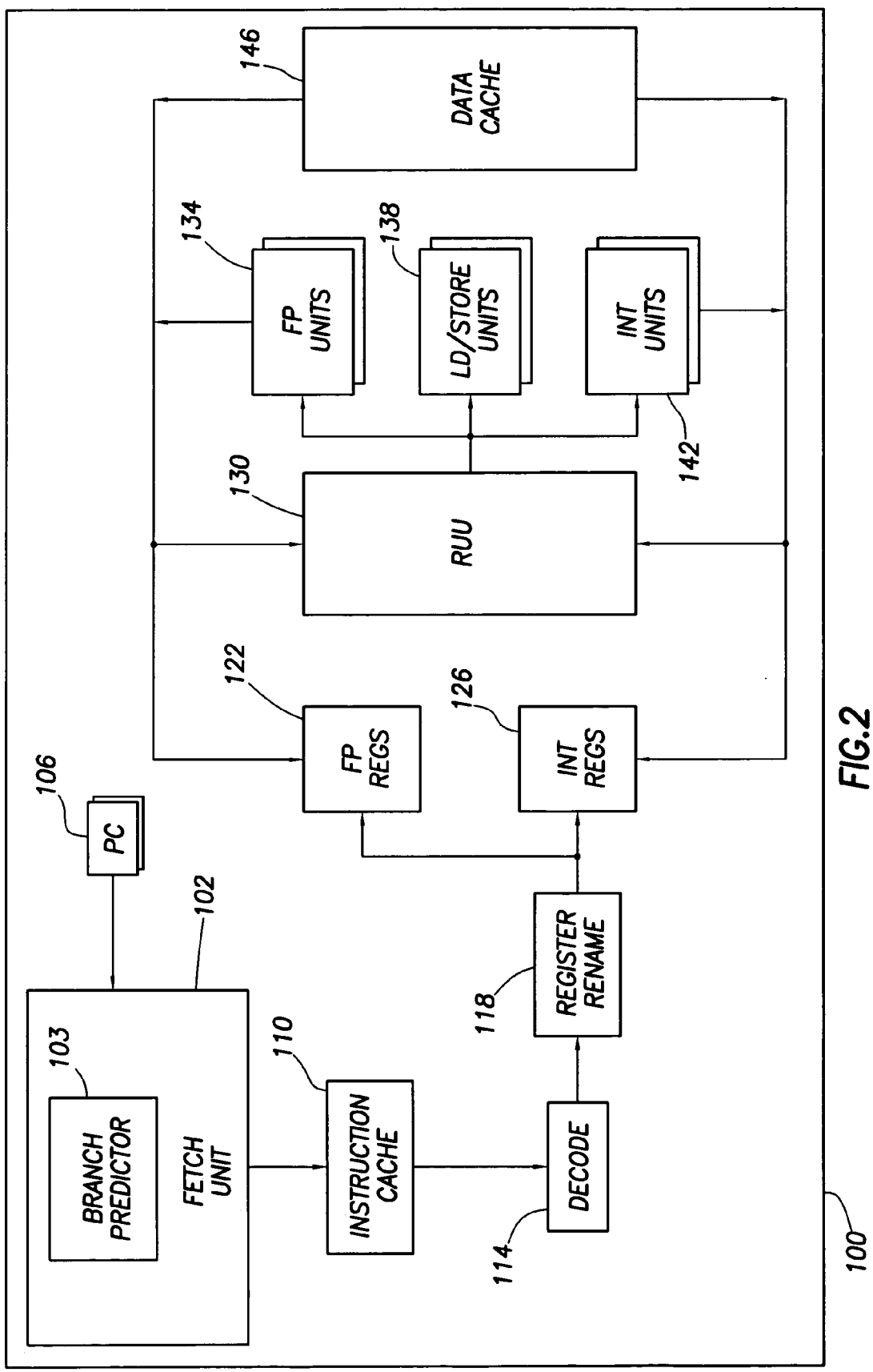
FIG. 2 is a block diagram of the simultaneous multithreading processor from FIG. 1 in accordance with the preferred embodiment.
Figure 3:
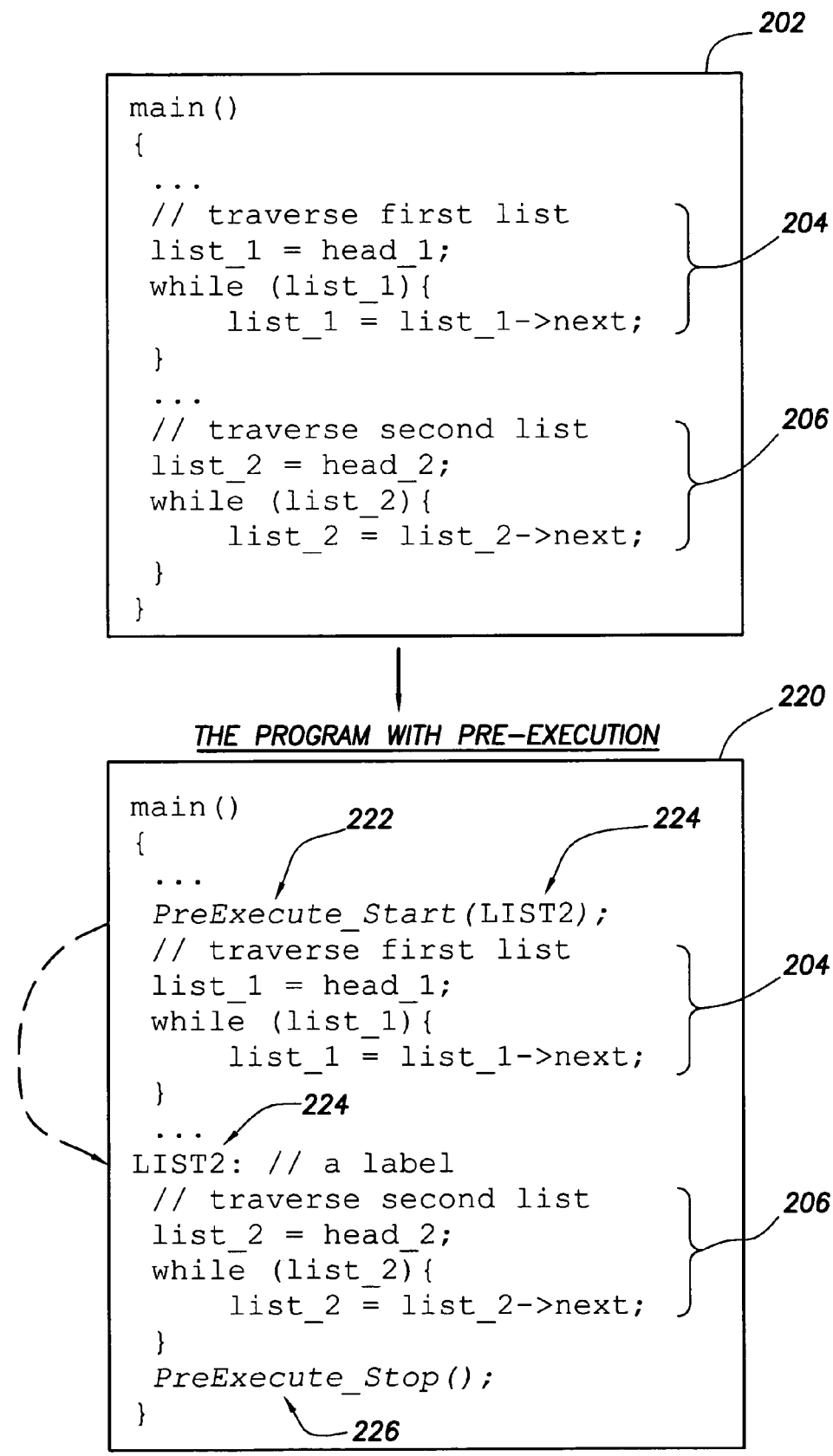
FIG. 3 illustrates how a program can be modified to reduce the performance impact of cache misses.

In accordance with a preferred embodiment of the invention, a simultaneous multithreading processor is used to reduce the potential for cache misses to occur. FIGS. 1 and 2 show a computer system that incorporates such a processor and FIGS. 3 and 4 illustrate its use in solving the problems noted above. In general, the principles discussed below can be applied to any type of computer that executes multiple threads of control that share some common cache structures. For sake of explanation, a simultaneous multithreading processor is used to explain the principles.

Referring now to FIG. 1, a computer system 90 is shown including a pipelined, simultaneous multithreading threaded ("SMT") processor 100 constructed in accordance with the preferred embodiment of the invention. Besides processor 100, computer system 90 may also include dynamic random access memory ("DRAM") 92, an input/output ("I/O") controller 93, and various I/O devices which may include a floppy drive 94, a hard drive 95, a keyboard 96, and the like. The I/O controller 93 provides an interface between processor 100 and the various I/O devices 94-96. The DRAM 92 can be any suitable type of memory devices such as RAM-BUS™ memory. In addition, SMT processor 100 may also be coupled to one or more other processors if desired.

FIG. 2 shows the SMT processor 100 of FIG. 1 in greater detail. The embodiment shown in FIG. 2 is exemplary only-any SMT processor architecture consistent with the principles discussed herein is acceptable. Referring to FIG. 2, processor 100 preferably comprises a pipelined architecture which includes a series of functional units, arranged so that several units can be simultaneously processing appropriate parts of multiple instructions. As shown, the exemplary embodiment of processor 100 includes a fetch unit 102, one or more program counters 106, an instruction cache 110, decode logic 114, register rename logic 118, floating point and integer registers 122, 126, a register update unit 130, execution units 134, 138, and 142, and a data cache 146.

Fetch unit 102 uses one or more program counters 106 for assistance as to which instructions to fetch. Being a multi-threading processor, the fetch unit 102 preferably can simultaneously fetch instructions from multiple threads. A separate program counter 106 is associated with each thread. Each program counter 106 is a register that contains the address of the next instruction to be fetched from the corresponding thread by the fetch unit 102. FIG. 2 shows two program counters 106 to permit the simultaneous fetching of instructions from two threads. It should be recognized, however, that additional program counters can be provided to fetch instructions from more than two threads simultaneously.

As shown, fetch unit 102 includes branch prediction logic 103. The branch prediction logic 103 permits the fetch unit 102 to speculate ahead on branch instructions. In order to keep the pipeline full (which is desirable for efficient operation), the branch predictor logic 103 speculates the outcome of a branch instruction before the branch instruction is actually executed. Branch predictor 103 generally bases its speculation on previous instructions. Any suitable speculation algorithm can be used in branch predictor 103.

Referring still to FIG. 2, instruction cache 110 provides a temporary storage buffer for the instructions to be executed. Decode logic 114 retrieves the instructions from instruction cache 110 and determines the type of each instruction (e.g., add, subtract, load, store, etc.). Decoded instructions are then passed to the register rename logic 118 which maps logical registers onto a pool of physical registers.

The register update unit ("RUU") 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 2).

The floating point register 122 and integer register 126 are used for the execution of instructions that require the use of such registers as is known by those of ordinary skill in the art. These registers 122, 126 can be loaded with data from the data cache 146. The registers also provide their contents to the RUU 130.

As shown, the execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instruction while the integer execution units 142 execute integer-based instructions. The load/store units 138 perform load operations in which data from memory is loaded into a register 122 or 126. The load/store units 138 also perform store operations in which data from registers 122, 126 is written to data cache 146 and/or DRAM memory 92 (FIG. 1).

The architecture and components described herein are typical of microprocessors, and particularly pipelined, multithreaded processors. Numerous modifications can be made from that shown in FIG. 2. For example, the locations of the RUU 130 and registers 122, 126 can be reversed, if desired.

In general, any memory reference (e.g., a store or load) in a program will result in a cache miss if the needed data is not currently present in data cache 146. However, in accordance with the preferred embodiment of the invention, the SMT processor 100 can be used to spawn (i.e., create, initialize and execute) a thread which resolves cache misses ahead of the main program. This spawned thread preferably runs concurrently with, but ahead of, the thread in which the main program executes. When the main program then encounters a memory reference, the needed data has already been cached by the previously spawned thread. In this context, the thread in which the main program executes is called the "main" thread and the thread which is spawned to resolve cache misses is called the "pre-execution" thread.

This technique can be understood with reference to FIG. 3. FIG. 3 shows the same portion of a program in two different forms 202 and 220. Each program form 202, 220 includes two program segments 204 and 206. Program 202 represents the program without the ability to spawn pre-execution threads. Program 220 represents program 202 modified to spawn pre-execution threads at desired points during program execution. As shown, the modifications include start and stop pre-execution thread instructions 222 and 226, as well as a label 224. In accordance with the preferred embodiment, the instruction to start a pre-execution thread is of the form "PreExecute_Start(label)" where "label" is a value that informs the program counter 106 where to begin executing the pre-execution thread. In the example of FIG. 3, "label" is "LIST2" which is identified by numeral 224. Thus, at run-time, when PreExecute_Start (LIST2) is executed by the main thread, a pre-execution thread will be spawned to execute the program starting at the label LIST2. The pre-execution thread then continues executing code segment 206 from LIST2 until the PreExecute_Stop() instruction 226 is encountered.

While the main thread is executing code segment 224, the pre-execution thread runs ahead of the main thread and executes code segment 206. Cache misses encountered during the execution of segment 206 by the pre-execution thread preferably are resolved before the main thread encounters the same memory references when it executes code segment 206. Broadly speaking, the pre-execution thread resolves one or more memory references and causes the requested data to be in data cache 146 before the main thread needs the data.

The start/stop instructions shown in FIG. 3 represent one way to cause a thread to be spawned. In general, any mechanism to spawn a pre-execution thread is within the scope of this disclosure. For example, a pre-execution thread could simply be programmed to spin on a synchronization variable. Then, the main thread can reset the synchronization variable when there are instructions to pre-execution thereby causing the pre-execution to pre-execute such instructions.

The process of spawning a pre-execution thread generally requires the pre-execution thread to have access to the register data from the main thread. Accordingly, the main thread can write values of the registers that will be needed by the pre-execution thread into memory. Then, the pre-execution thread will load these values from memory before starting pre-execution.

Besides using a stop instruction, such as PreExecute_Stop( ) 226, to terminate a pre-execution thread, there are numerous other ways to terminate a pre-execution thread. For example, a PreExecute_Cancel(T) instruction can be used in the main thread. When the main thread encounters this instruction, the pre-execution thread will be terminated. Additionally, when the pre-execution thread tries to pre-execute a program counter (PC) that is out of the acceptable range of instructions as imposed by the operating system, the pre-execution thread will be terminated. Also, the pre-execution thread can be terminated when the hardware detects the main thread has caught up to the pre-execution thread. Finally, but without limitation, the pre-execution thread can be terminated when the number of instructions it has run exceeds a limit. This makes sure that all pre-execution threads eventually terminate.

FIG. 4 illustrates a method 250 of implementing pre-execution threads. The method 250 includes steps 252, 254, 256 and 258. In step 252, the pre-execution instructions are inserted into the program. These instructions include both the start and stop instructions, as well as the labels. These instructions can be inserted by the programmer or by a compiler. Then, in step 254, the processor 100 spawns pre-execution thread(s) when and where indicated by the pre-execution start instructions. The start pre-execution thread instruction preferably returns the identity of the spawned thread or a pre-designated value (e.g., −1) if there is are insufficient hardware resources available to spawn another thread. To spawn a pre-execution thread, various registers such a thread will use preferably are initialized. The registers should be initialized in accordance with the registers used by the main thread so that the pre-execution thread executes identically to the main thread. To this end, the preferred implementation of the invention uses software to copy the register values from the main thread to the pre-execution thread. More specifically, a software routine is constructed to save the register values of the main thread to memory and then retrieve them back from the memory to the registers of the pre-execution thread.

Step 256 acknowledges that the pre-execution thread(s) run concurrently with the main thread. While executing, it is desirable for the pre-execution thread to avoid speculative pre-execution from corrupting the program correctness. Accordingly, the preferred implementation ignores all exceptions such as invalid load addresses, division by zero, etc. generated during pre-execution. In this way, the main thread will not encounter any additional exceptions. In addition, pre-execution threads should not be permitted to modify memory contents (e.g., stores). Thus, in accordance with the preferred embodiment, all store instructions encountered during pre-execution are dropped by processor 100 after they are decoded. That is, they are executed as no-ops ("NOPs").

Instead of simply dropping pre-execution stores, a "scratchpad" buffer can be added to the hardware to buffer the effect of stores during pre-execution. Instead of writing into the cache and the memory, stores in a pre-execution thread will write into the scratchpad buffer which may be coupled to the load/store units 138. In this way, loads in the same pre-execution thread will look up data in both the cache and scratchpad. The main advantage of this approach is that pre-executed loads can observe the effect of earlier stores from the same thread, which may be important to generating future data addresses or maintaining the correct control flow. For instance, if a procedure with a pointer-type argument (e.g., the head of a linked list) is called during pre-execution, both the pointer value and the return address could be passed through the stack. Thus, it would be desirable to be able to read both values back from the stack in the procedure during pre-execution so that the correct data item can be fetched and the procedure can eventually return to its caller as well.

It should be apparent that, although the threads run concurrently with one another, the pre-execution thread preferably does not run the same instructions as the main thread at the same time. That is, by causing the pre-execution thread to jump ahead of the main thread and begin executing at a later point in program order, a "slack" between the two threads is automatically created. This slack facilitates the pre-execution thread to resolve cache misses before the main program requests the data. Finally, in step 258 the pre-execution thread ceases when it encounters its stop execution instruction.

The pre-execution capability described herein is software implemented and controlled as should be apparent. Common uses of software-controlled pre-execution include pre-execution multiple pointer chains, pre-executing loops involving non-affined array references, pre-execution multiple procedure calls, and pre-executing multiple control-flow paths, to name a few. Further, pre-execution may also be useful to avoid branch mispredictions, which is a problem well known to those of ordinary skill in the art and described in U.S. patent application Ser. No. 09/584,034 entitled "Slack Fetch to Improve Performance in a Simultaneous and Redundantly Thread Processor."

Accordingly, the preferred embodiment of the invention provides a significant performance increase in a processor. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a processor capable of executing multiple threads; and
a main system memory coupled to said processor;
wherein said processor processes a program in a main thread that includes instructions which cause the processor to spawn a pre-execution thread in which only a portion, but not all, of the same program executes, said pre-execution thread runs concurrently with the main thread, but ahead of the main thread in program order, wherein cache misses encountered by the pre-execution thread are resolved before the main thread encounters the cache misses.

2. The computer system of claim 1 wherein said instructions that cause the pre-execution thread to be spawned include a start instruction which causes a pre-execution thread to start and a stop instruction which causes the pre-execution thread to stop.

3. The computer system of claim 2 wherein said start instruction includes a value designating the location in the program where the pre-execution thread is to start running.

4. The computer system of claim 1 wherein the pre-execution thread encounters a cache miss condition for a memory reference but the main thread does not encounter a cache miss condition when that same memory reference is processed by the main thread.

5. The computer system of claim 1 wherein said processor determines whether sufficient hardware resources are available before spawning said pre-execution thread.

6. The computer system of claim 1 wherein said processor ignores exception conditions generated during the pre-execution thread.

7. The computer system of claim 1 wherein said processor does not permit a store instruction in the pre-execution thread to modify main system memory contents.

8. The computer system of claim 1 wherein said instructions that cause the pre-execution thread to be spawned include a value that informs a program counter where to begin executing the pre-execution thread.

9. The computer system of claim 1 further including a buffer into which pre-execution thread stores data is written to make such store data available to pre-execution thread load instructions.

10. A processor, comprising:
a fetch unit capable of fetching instructions from a plurality of threads;
a program counter coupled to said fetch unit;
an instruction cache coupled to said fetch unit;
a data cache coupled to said instruction cache;
wherein said processor processes a program in a first thread that includes instructions which cause the processor to spawn a second thread in which only a portion, but not all, of the same program also executes, said second thread runs concurrently with the first thread, but ahead of the first thread in program order, wherein cache misses encountered by the second thread are resolved before the first thread encounters the cache misses.

11. The processor of claim 10 wherein said instructions that cause a second thread to be spawned include a start instruction which causes the second thread to start and a stop instruction which causes the second thread to stop.

12. The processor of claim 11 wherein said start instruction includes a value designating the location in the program where the second thread is to start running.

13. The processor of claim 10 wherein the second thread encounters a cache miss condition for a memory reference but the first thread does not encounter a cache miss condition when that same memory reference is processed by the first thread.

14. The processor of claim 10 wherein said processor determines whether sufficient hardware resources are available before spawning said second thread.

15. The processor of claim 10 wherein said processor ignores exception conditions generated during the second thread.

16. The processor of claim 10 wherein said processor does not permit a store instruction in the second thread to modify data cache contents.

17. The processor of claim 10 wherein said first and second threads execute same instructions but the second thread executes the same instructions before the first thread to resolve cache misses before the first thread requests data previously subject to a cache miss.

18. The processor of claim 10 further including a buffer into which pre-execution thread store data is written to make such store data available to pre-execution thread load instructions.

19. A method of running a program in a processor, comprising:
(a) inserting pre-execution thread instructions in the program;
(b) spawning a pre-execution thread when designated by the inserted instructions; and
(c) running said pre-execution thread concurrently with a main thread wherein both the pre-execution and the main threads include instructions from the same program, the pre-execution thread running ahead of the main thread and containing only a portion of the instructions from the main thread, wherein cache misses encountered by the pre-execution thread are resolved before the main thread encounters the cache misses.

20. The method of claim 19 further including stopping the pre-execution thread when designated by the inserted instructions in (a).

21. The method of claim 19 further including copying register contents associated with the main thread to registers used by the pre-execution thread.

22. The method of claim 19 further including determining whether sufficient hardware resources are available to spawn the pre-execution thread.

23. The method of claim 19 further including ignoring all exception conditions generated during the pre-execution thread.

24. The method of claim 19 further including creating sufficient slack in time for executing same instructions between the main thread and the pre-execution thread so the pre-execution thread has time to resolve cache misses before the main thread requests data previously subject to a cache miss.

25. The method of claim 19 further including copying the contents of at least one register to memory to make such contents available to the pre-execution thread.

26. The method of claim 19 further including writing pre-execution store data into a buffer that can be accessed by a pre-execution load instruction.

27. The method of claim 19 further including not permitting any store instruction in the pre-execution thread to modify memory contents.

28. The method of claim 19 wherein (a) includes inserting a start instruction which causes the processor to start the pre-execution thread.

29. The method of claim 19 wherein the start instruction specifies a location in the program at which the pre-execution thread is to start running.

30. The method of claim 19 wherein (a) includes inserting a stop instruction which causes the processor stop the pre-execution thread.

31. A processor, comprising:
   a fetch unit capable of fetching instructions from a plurality of threads;
   a program counter coupled to said fetch unit;
   an instruction cache coupled to said fetch unit;
   a data cache coupled to said instruction cache;
   wherein, in a pre-execution thread, said processor pre-executes instructions from a main thread that are specified by said main thread, wherein a cache miss encountered by the pre-execution thread is resolved before the main thread encounters the cache miss.

32. The processor of claim 31 wherein the pre-execution thread is caused to be spawned to pre-execute said instructions by an instruction in the main thread.

33. The processor of claim 31 wherein the pre-execution thread spins on a variable that is set to a predetermined value by the main thread when there are instructions to pre-execute.

34. The processor of claim 31 wherein the processor ceases pre-executing instructions when a program counter is encountered that exceeds a range.

35. The processor of claim 31 wherein the processor ceases pre-executing instructions when the main thread catches up to the pre-executing instructions.

36. The processor of claim 31 wherein the processor ceases pre-executing instructions when the number of pre-executing instructions exceeds a limit.

* * * * *

UNITED STATES PATENT AND TRADEMARK OFFICE
CERTIFICATE OF CORRECTION

PATENT NO.      : 7,343,602 B2                                Page 1 of 1
APPLICATION NO. : 10/029699
DATED           : March 11, 2008
INVENTOR(S)     : Chi-Keung Luk et al.

It is certified that error appears in the above-identified patent and that said Letters Patent is hereby corrected as shown below:

In The Drawings
On sheet 3 of 3, in Fig. 3, above Box "202", insert -- THE ORIGINAL PROGRAM --

Signed and Sealed this

Fifteenth Day of July, 2008

JON W. DUDAS
*Director of the United States Patent and Trademark Office*